United States Patent [19]

Fedor

[11] Patent Number: 4,892,273

[45] Date of Patent: Jan. 9, 1990

[54] ACTIVE DAMPING OF SPACECRAFT STRUCTURAL APPENDAGE VIBRATIONS

[75] Inventor: Joseph V. Fedor, West Hyattsville, Md.

[73] Assignee: The United States of America as represented by the Administrator of the National Aeronautics and Space Administration, Washington, D.C.

[21] Appl. No.: 292,143

[22] Filed: Dec. 30, 1988

[51] Int. Cl.$^4$ .............................. B64G 1/28
[52] U.S. Cl. .................. 244/158 R; 244/165; 244/173
[58] Field of Search .............. 244/164, 165, 173, 79, 244/75 R, 75 A, 76 R, 76 C, 191, 194; 364/433, 434

[56] References Cited

U.S. PATENT DOCUMENTS

| | | | |
|---|---|---|---|
| 2,550,806 | 5/1951 | Hammond | 244/79 |
| 3,339,863 | 9/1967 | Webb | 244/173 |
| 3,531,063 | 9/1970 | Persegheffi | 244/79 |
| 4,562,546 | 12/1985 | Wykes et al. | 244/75 A |
| 4,567,564 | 1/1986 | Bittner et al. | 244/164 |

OTHER PUBLICATIONS

Bergeron et al., "Modular Spacecraft Sys", EPO Application No. 0196793, Oct. 1986.
Fleischer, "Multi-Rigid-Body Attitude Dynamics Simulation", NASA Technical Report 32-1516.

Primary Examiner—Galen L. Barefoot
Attorney, Agent, or Firm—R. Dennis Marchant; John R. Manning; Alan J. Kennedy

[57] ABSTRACT

An active vibration damper system, for bending in two orthogonal directions and torsion, in each of three mutually perpendicular axes is located at the extremities of the flexible appendages of a space platform. The system components for each axis includes: an accelerometer, filtering and signal processing apparatus, and a DC motor-inertia wheel torquer. The motor torquer, when driven by a voltage proportional to the relative vibration tip velocity, produces a reaction torque for opposing and therefore damping a specific modal velocity of vibration. The relative tip velocity is obtained by integrating the difference between the signal output from the accelerometer located at the end of the appendage with the output of a usually carried accelerometer located on a relatively rigid body portion of the space platform. A selector switch, with sequential stepping logic or highest modal vibration energy logic, steps to another modal tip velocity channel and receives a signal voltage to damp another vibration mode. In this manner, several vibration modes can be damped with a single sensor/actuator pair. When a three axis damper is located on each of the major appendages of the platform, then all of the system vibration modes can be effectively damped.

10 Claims, 3 Drawing Sheets

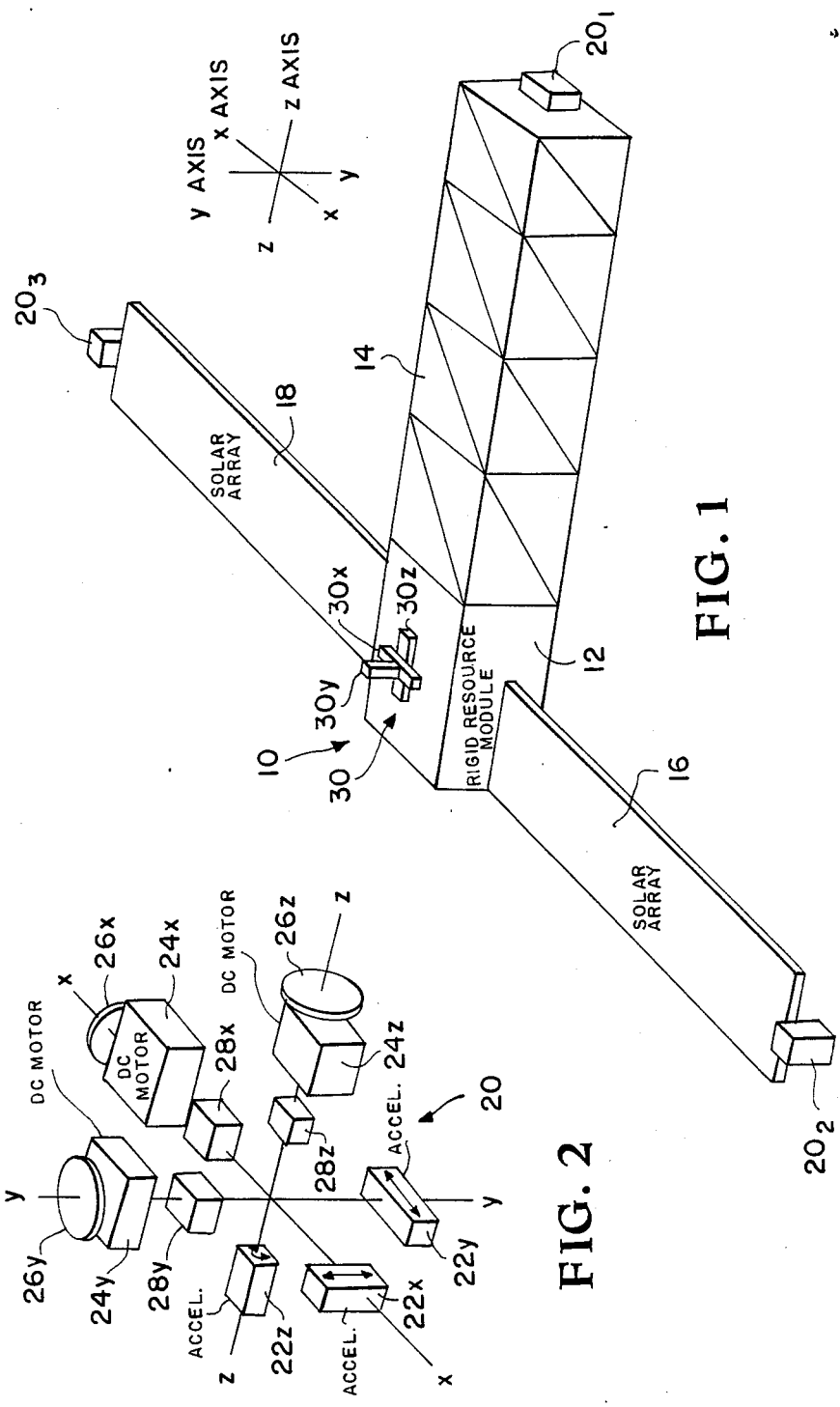

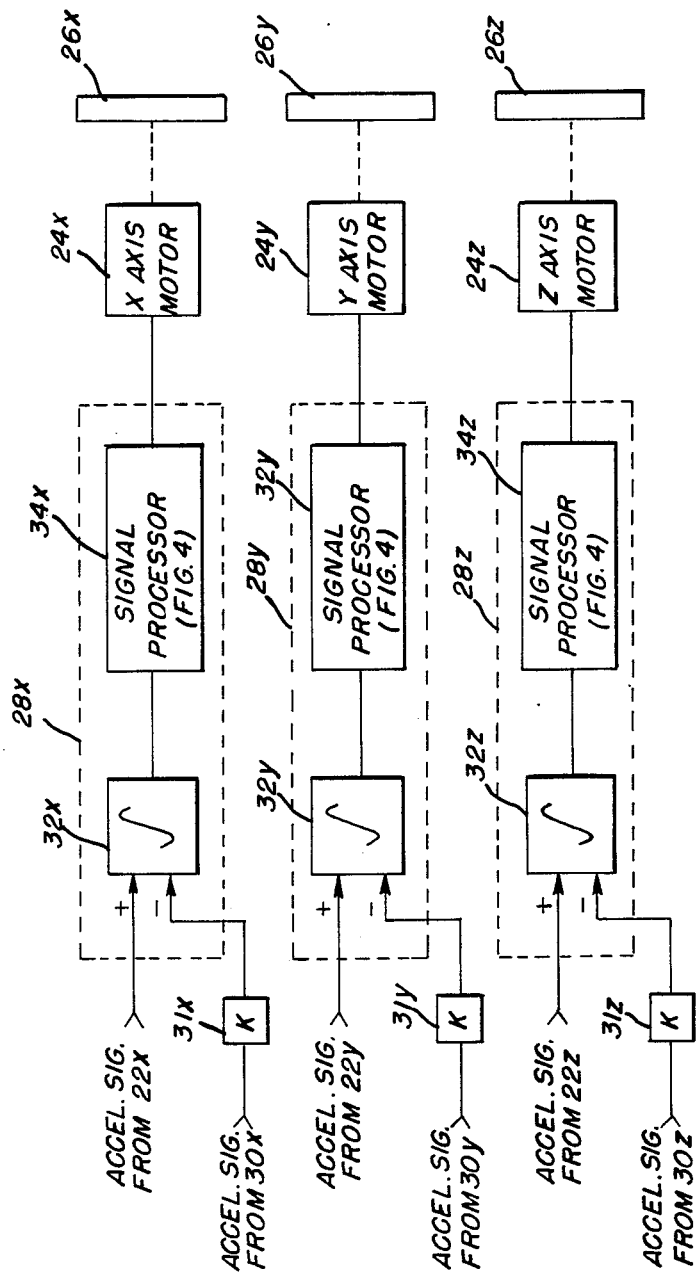

ACTIVE DAMPING OF SPACECRAFT STRUCTURAL APPENDAGE VIBRATIONS

BACKGROUND OF THE INVENTION

1. Technical Field

This invention relates generally to vibration damping means and more particularly to an active vibration damping system for damping the structural appendage vibrations of a spacecraft.

2. Background Art

One type of conventional spacecraft comprises a space platform which typically includes a rigid resource module, a relatively flexible truss like instrument section, and one or more deployable solar arrays. The instrument section and solar arrays are relatively long and flexible, having lengths, for example, from 45 to 60 feet. These elongated structural appendage elements have a tendency to flex when subjected to thermal disturbances when moving in and out of the earth's shadow, during slewing attitude control maneuvers and as a result of internal disturbances caused by the moving parts within the instrument section itself. These disturbances induce structural vibrations which persist for relatively long lengths of time because of the normally small inherent structural damping of the spacecraft. The persistent vibrations can degrade the scientific and engineering missions of the space platform It should be noted that zero momentum, non-spinning, 3 axis controlled space platforms, to which this invention is applicable, normally carry a propulsion subsystem and an attitude control subsystem in the rigid resource module. Linear accelerometers comprise an element of the propulsion system and rate gyros comprise an element of the attitude control system (angular acceleration can be obtained by differentiation of the rate gyro information). These elements are utilized in the subject invention as well as other components that are placed at the appendage tips as will be disclosed hereinafter.

Current state of the art spacecraft structural damping systems use either passive or active damping techniques. Passive damping apparatus is relatively simple but has the inherent limitation of being excessively heavy and requires an undesired long duration of time to dampen motion, particularly low frequency vibrations. Active methods typically employ several sensors and actuators which are distributed within the structure. This necessitates complicated signal processing requiring the use of a relatively powerful computer, resulting in a relatively heavy, bulky package which causes significant electrical power drain.

SUMMARY

It is an object of the present invention, therefore, to provide an improvement in vibration damping apparatus.

It is another object of the invention to provide active vibration damping apparatus.

It is still a further object of the invention to reduce structural appendage vibrations in a relatively short time.

It is yet a further object of the invention to provide an active vibration damping system for damping the structural appendages of a space platform and which is independent of the normally carried spacecraft attitude control system.

And yet another object of the invention is to provide a relatively fast acting active damping system for spacecraft so as to enhance the efficiency of operation, which in turn leads to a greater mission success capability.

The foregoing and other objects of the invention are accomplished by including three-axis active vibration damper systems at the ends of the flexible appendages of a space platform requiring the damping of bending and torsional vibrations. The appendage tip is an ideal place to sense and control all of the structural vibrations of a typical space platform because it is never a vibration node. Each damper system includes, for each axis of vibration damping, an accelerometer (linear for bending and angular for torsion), filtering and signal processing apparatus, and a DC motor-inertia wheel torquer. The motor torquer, when driven by a voltage proportional to the relative tip velocity, produces reaction torques for opposing and therefore damping the appendage vibrations. The relative tip velocity is obtained by integrating the difference between the signal output from the accelerometer located at the end of the appendage with the output of an accelerometer located on a relatively rigid body portion of the spacecraft. A selector switch, with sequential stepping logic or highest modal vibration energy logic, steps to another modal tip velocity channel and receives a signal voltage to damp another vibration mode. In this manner, several vibration modes can be damped with a single sensor/actuator pair. When a three axis damper is located on each of the major appendages of the platform, then all of the system vibration modes can be effectively damped.

BRIEF DESCRIPTION OF THE DRAWINGS

The subject invention will be better understood when the detailed description of the invention is considered in conjunction with the accompanying drawings in which:

FIG. 1 is a perspective diagram of a spacecraft in the form of a space platform having elongated structural elements or appendages;

FIG. 2 is a diagram illustrative of a three axis motion damper system located at the extremities of the appendages shown in FIG. 1;

FIG. 3 is a schematic block diagram of the circuitry utilized to drive the inertia wheel motors shown in FIG. 2.

DESCRIPTION OF THE PREFERRED EMBODIMENT

Figure 4:
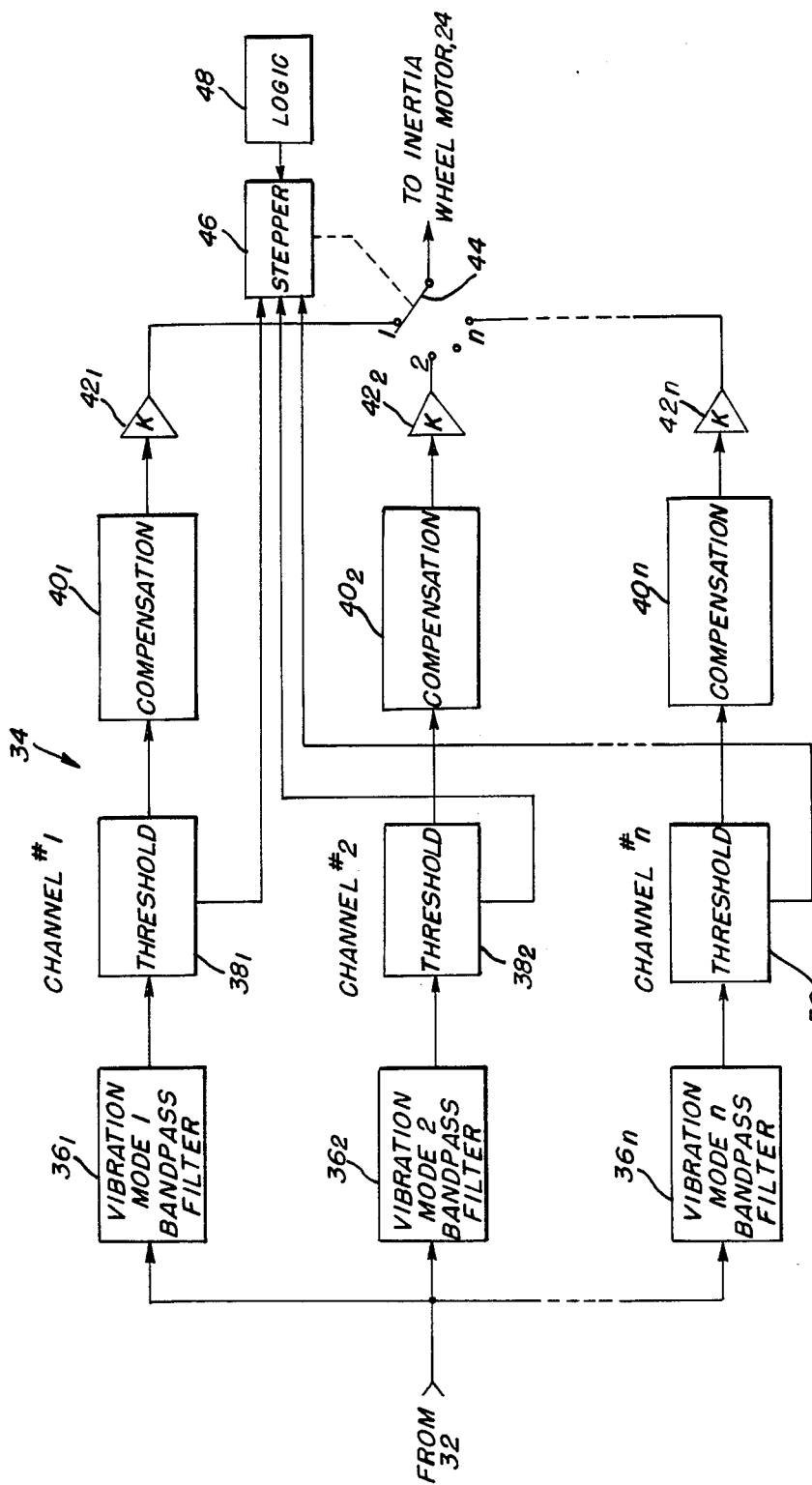
FIG. 4 is a schematic block diagram of the signal processing circuits shown in FIG. 3.

Referring now to the drawings wherein like reference numerals refer to like components throughout, attention is directed first to FIG. 1. There reference numeral 10 denotes a spacecraft which comprises a platform for scientific instrumentation. An X, Y, Z coordinate system is shown for ease of subsequent description.

The space platform 10 as shown in FIG. 1 includes a relatively rigid resource module portion 12, an elongated truss like instrument section 14 which extends outwardly therefrom along a central longitudinal axis which is parallel to the Z axis and a pair of solar arrays which extend outwardly from the bodY 12 in mutually opposite directions along the X axis. The instrument section 14 and the pair of solar arrays 16 and 18 comprise structural appendage elements which have flexible characteristics and therefore subject to structural modal vibrations which can be induced therein and due to their build up, degrade performance of the various apparatus onboard the spacecraft.

In order to damp the vibrational motion and thereby enhance operational performance, the subject invention contemplates locating three-axis active damper systems $20_1$, $20_2$, and $20_3$ at the respective ends or tips of the appendage members 14, 16 and 18.

As shown in FIG. 2, each three-axis damper system 20 includes three accelerometers (two linear and one angular) $22_x$, $22_y$ and $22_z$, three inertia wheel DC drive motors $24_x$, $24_y$ and $24_z$ respectively connected to three inertia wheels $26_x$, $26_y$ and $26_z$, with the DC motors being operated in accordance with drive signals generated by three respective motor drive circuits $28_x$, $28_y$ and $28_z$. Thus a DC motor-inertia wheel torquer is provided for each of the three axes.

The individual DC motor-inertia wheel torquers, when driven by a voltage proportional to the relative vibration velocity of motion at the location of the damping systems accordingly produce reaction torques opposing and thus damping the appendage vibrations. An important feature of the invention lies in the fact that advantage can be taken of sensors that are normally included in the attitude control and orbit adjust systems of the central body which typically comprises rate gyros and linear accelerometers. This is shown by reference numeral 30 (FIG. 1). These sensors provide dynamic information as to the existing motion of the rigid resource module portion 12 rotationally and linearly.

This now leads to the consideration of FIG. 3. For each appendage accelerometer $22_x$, $22_y$ and $22_z$, there is produced an inertial acceleration signal of the motion at the tip of the appendage. This signal is coupled to a respective integrating circuit $32_x$, $32_y$ and $32_z$ along with a signal corresponding to the inertial acceleration from the resource module sensor 30. The difference signal between the two inputs to the integrating circuits $32_x$, $32_y$ and $32_z$ is integrated to provide an output signal voltage proportional to the relative tip velocities along the respective x, y axes and around the z axis. The relative tip velocity signals are coupled to the respective signals processors, the details of which are shown in FIG. 4, which separate the signal into tip vibrational modal component velocities from which is generated respective DC drive voltages for the inertia wheel motors $24_x$, $24_y$ and $24_z$.

As shown in FIG. 4, the signal processors $34_x$, $34_y$ and $34_z$ are comprised of n signal channels, each including an input bandpass filter $36_1$, $36_2$ ... $36_n$ which output a predetermined velocity mode component signal which is coupled to the respective amplitude threshold circuit $38_1$, $38_2$ ... $38_n$. When a predetermined threshold is exceeded for the input signal applied thereto, the tip modal velocity voltage is coupled to a compensation network $40_1$, $40_2$ ... $40_n$ which conditions the signal for proper phasing for use by the respective inertia wheel DC motor $24_x$, $24_y$ and $24_z$. Prior to being applied to the motor, however, the output of the compensator networks $40_1$, $40_2$ ... $40_n$ are applied to respective signal amplifiers $42_1$, $42_2$ ... $42_n$ for proper gain adjustment for driving the motor. After each vibration mode signal is reduced below the respective threshold values, a selector switch 44 operated by an electrically actuated stepper device 46 with sequential stepping logic or highest modal vibration energy logic 48 steps to the next vibration mode channel and receives the corresponding voltage to damp that specific mode and accordingly, a single accelerometer and DC torquer can be used to sequentially damp several vibration modes in any one axis.

The apparatus shown and described in FIGS. 2–4 can be used to substantially reduce and eliminate bending vibration in two orthogonal directions and also in torsion to provide three axis appendage damping of the spacecraft appendage vibrations. By providing a three axis damper on each of the major appendages of the platform and appropriate logic, not shown, coordinating the dampers, all of the significant system vibration modes can be alleviated.

Thus what has been shown and described is a relatively simple arrangement whereby torsion and two directional bending structural modes can be damped simultaneously while utilizing a minimum number of system components. A reasonable bandwidth of the active damper system is possible so that substantially all vibration modes of interest can be damped. For any given platform vibration mode, a specified damping zeta (5) can be achieved with the subject invention so that attitude control systems for spacecraft having flexible elements can be designed with a minimum of effort. The number of vibration modes that can be damped is limited only by the number of filters and electronic signal processing circuits that are included in the damper design.

Having thus shown and described what is at present considered to be the preferred embodiment of the invention, it should be known that the same has been made by way of illustration and not limitation. Accordingly, all modifications, alterations and changes coming within the spirit and scope of the invention as defined by the following claims are herein meant to be included.

I claim:

1. Apparatus located on a space platform for actively damping structural appendage vibrations along three mutually perpendicular axes of a generally flexible body member attached to a generally rigid body member wherein the apparatus for each axis comprises:

means for sensing the inertial acceleration substantially at the end of said flexible body member and generating a first acceleration signal indicative thereof;

means for sensing the inertial acceleration of said rigid body member and generating a second acceleration signal indicative thereof;

means for determining the difference between said first and second acceleration signals and integrating the difference therebetween to generate a signal proportional to the relative motional velocity at the end of said flexible body member;

electrical circuit means responsive to said signal proportional to relative velocity for generating a motor drive signal;

an electric motor responsive to said motor drive signal for operating an inertia wheel; and an inertia wheel connected to said motor for developing a torque for damping a predetermined vibrational mode along one of said axes.

2. The apparatus as defined by claim 1 wherein said means for sensing the inertial acceleration comprise accelerometers which generate an electrical signal corresponding to the acceleration sensed thereby.

3. The apparatus as defined by claim 1 wherein said electrical circuit means for generating a motor drive signal includes at least one electrical signal filter responsive to said signal proportional to the relative velocity for providing an output of a predetermined vibrational mode velocity signal, and additionally including signal conditioning means responsive to said velocity signal to drive said electric motor.

4. The apparatus as defined by claim 3 wherein said electric motor comprises a DC motor.

5. The apparatus as defined by claim 1 wherein said electrical circuit means includes,
a plurality of signal bandpass filters commonly coupled to said signal proportional to relative velocity, each of said filters having individual filter characteristics for separating said signal proportional to relative velocity into a plurality of predetermined vibrational mode velocity signals,
respective signal conditioning circuit means coupled to said filters and being responsive to one of said plurality of vibrational mode velocity signals for generating respective motor drive signals, and
means for coupling said motor drive signals to said electric motor in a predetermined order for individually damping the vibrational modes of said flexible body member.

6. The apparatus as defined by claim 5 wherein said coupling means comprises electrical switch means coupled between said motor and said signal conditioning circuit means.

7. The apparatus as defined by claim 6 wherein said signal conditioning means includes a compensation network for providing proper phasing and signal gain to the respective motor drive signals.

8. The apparatus as defined by claim 6 and additionally including circuit means responsive to signal amplitude coupled to the output of each of said bandpass filters and being operable to couple a respective vibrational mode velocity signal to a respective signal conditioning circuit when a predetermined amplitude is reached.

9. The apparatus as defined by claim 8 wherein said circuit means responsive to signal amplitude is additionally operable to thereafter actuate said logic controlled switch means to couple another motor drive signal to said motor when said vibrational mode velocity signal falls below said predetermined amplitude.

10. The apparatus as defined by claim 1 wherein said space platform includes a plurality of generally flexible body members attached to said rigid body member.

* * * * *